Figure 5:
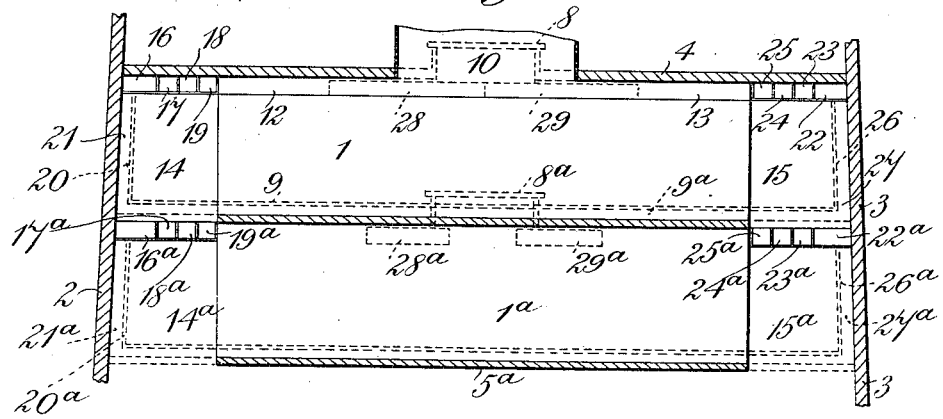

No. 839,689. PATENTED DEC. 25, 1906.
L. WILLIAMS.
APPARATUS FOR THE TREATMENT OF CARGOES AND GOODS IN SHIPS, WAREHOUSES, &c.
APPLICATION FILED FEB. 10, 1905.
4 SHEETS—SHEET 1.
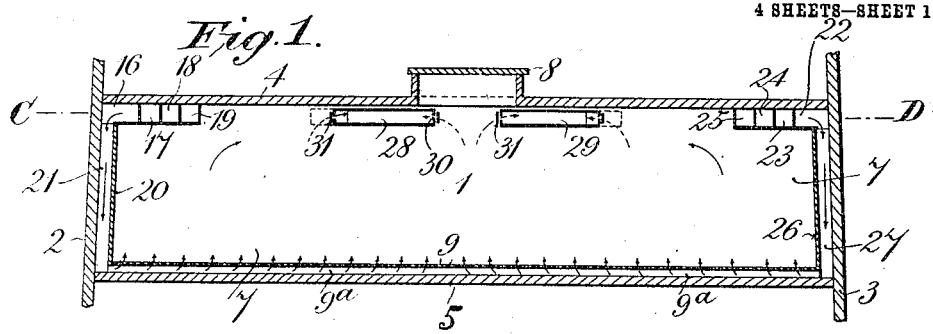
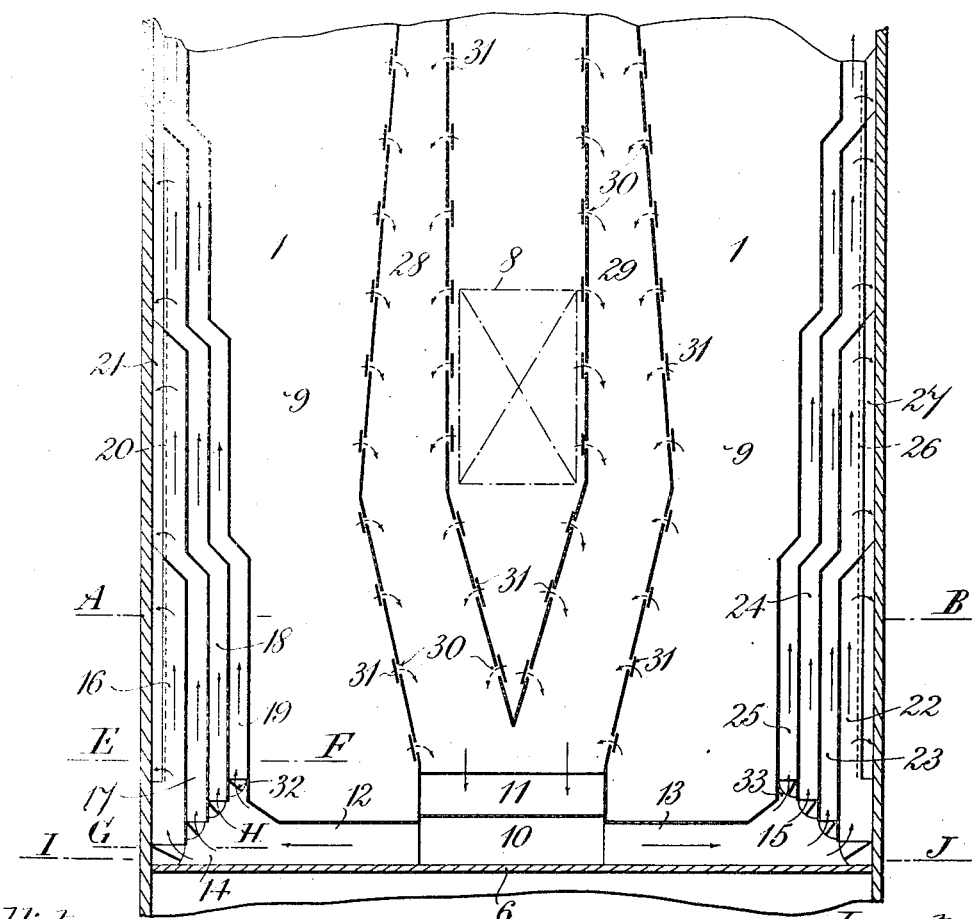

No. 839,689. PATENTED DEC. 25, 1906.
L. WILLIAMS.
APPARATUS FOR THE TREATMENT OF CARGOES AND GOODS IN SHIPS, WAREHOUSES, &c.
APPLICATION FILED FEB. 10, 1905.
4 SHEETS—SHEET 2.
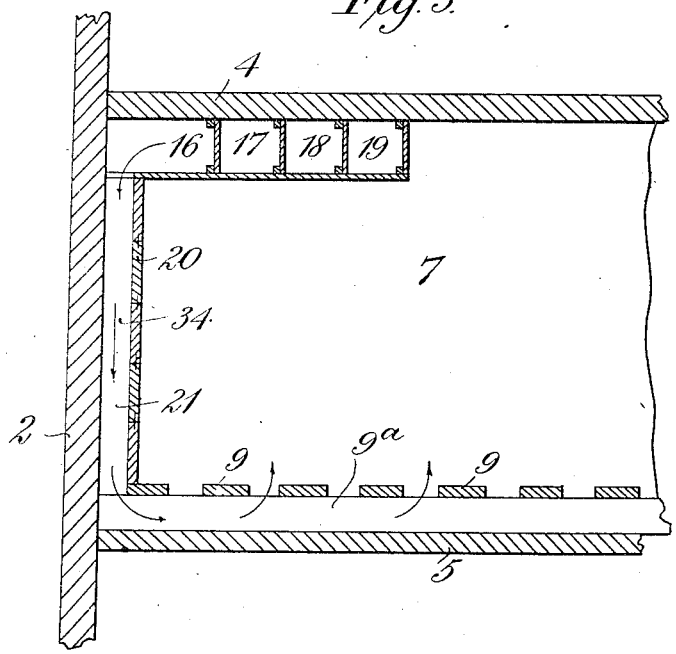
Fig. 3.
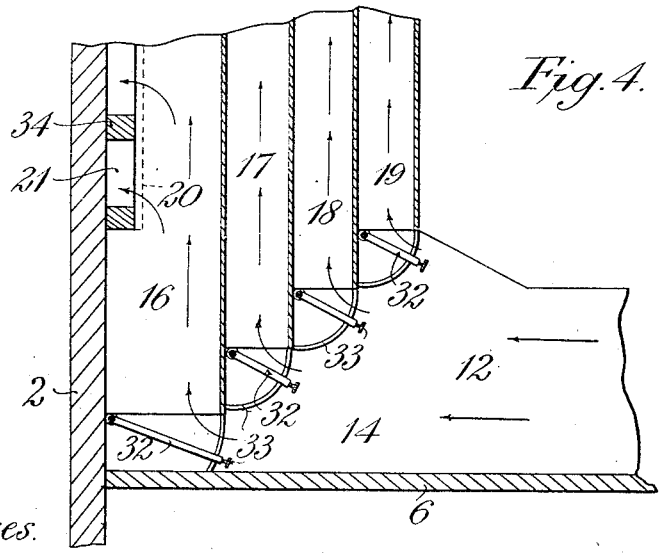
Fig. 4.
Witnesses.
Inventor.
Llewellyn Williams
ATTORNEYS No. 839,689. PATENTED DEC. 25, 1906.
L. WILLIAMS.
APPARATUS FOR THE TREATMENT OF CARGOES AND GOODS IN SHIPS, WAREHOUSES, &c.
APPLICATION FILED FEB. 10, 1905.

4 SHEETS—SHEET 3.

Witnesses.

Inventor:
Llewellyn Williams

No. 839,689. PATENTED DEC. 25, 1906.
L. WILLIAMS.
APPARATUS FOR THE TREATMENT OF CARGOES AND GOODS IN SHIPS, WAREHOUSES, &c.
APPLICATION FILED FEB. 10, 1905.

4 SHEETS—SHEET 4.

Witnesses
A. M. Kuehne
J. A. Percival

Inventor
Llewellyn Williams
By Richards
Attorneys

UNITED STATES PATENT OFFICE.

LLEWELLYN WILLIAMS, OF BOSTON, MASSACHUSETTS.

APPARATUS FOR THE TREATMENT OF CARGOES AND GOODS IN SHIPS, WAREHOUSES, &c.

No. 839,689.

Specification of Letters Patent.

Patented Dec. 25, 1906.

Application filed February 10, 1905. Serial No. 245,166.

*To all whom it may concern:*

Be it known that I, LLEWELLYN WILLIAMS, a citizen of the United States of America, and a resident of 131 State street, Boston, Massachusetts, have invented certain new and useful Improvements in Apparatus for Cooling Cargoes and Goods in Ships and the Like, of which the following is a specification.

The object of this invention is to provide an improved arrangement and combination of apparatus for ventilating and cooling a cargo uniformly throughout its extent in the holds or cargo-spaces of ships and the like, the term "cargo" being intended to cover only perishable substances of non-granular nature in bulk, such as bananas and other fruit, which can be stacked loose on the hold-floor.

This invention is not applicable to grain or substances of similar nature, which will always pack themselves very closely by virtue of their finely-divided state.

According to this invention I provide a grating or perforated false bottom extending over the floor or bottom of the cargo-space to be ventilated and raised off said floor or bottom, so as to provide below said grating or perforated false bottom an air-space serving as an air-chamber extending over the floor or bottom of the cargo-space, and into this air-space below the said grating or perforated false bottom I blow air in distribution proportioned to the horizontal extent of the cargo by means of suitable distributing-ducts connected to one or more fans or the like. The said ducts are arranged to discharge the air more or less equally or proportionally into said air-space throughout the length of the same, so that the pressure of the air rising through the interstices or perforations of the grating or false bottom will be approximately uniform or proportional, as desired. This air rises throughout the horizontal extent and depth of the cargo, which is to be stacked or piled on or over said grating or perforated false bottom, and it is drawn off from the top of the cargo-space by means of suitable return-ducts connected to the suction side of the fan or fans or the like to be either discharged into the atmosphere or returned by the fan or fans or the like into the aforesaid distributing-ducts to be recirculated through the cargo.

When it is desired to cool or refrigerate the cargo, as well as to ventilate it, the air is passed through suitable cooling or refrigerating apparatus before being discharged into the air-space below the grating or perforated false bottom.

The circulation of the cold air may be made complete—that is to say, it may form an entirely-closed system that is not open to the external atmosphere—the cold air being used over and over again until it becomes foul, when a small percentage of it is blown out and replaced by fresh air from the external atmosphere.

I shall now proceed to describe the manner in which my invention may be carried into practice in the case of a ship, with reference to the accompanying diagrammatic drawings, which show only so much of a ship as is necessary to illustrate the invention.

Figure 6:
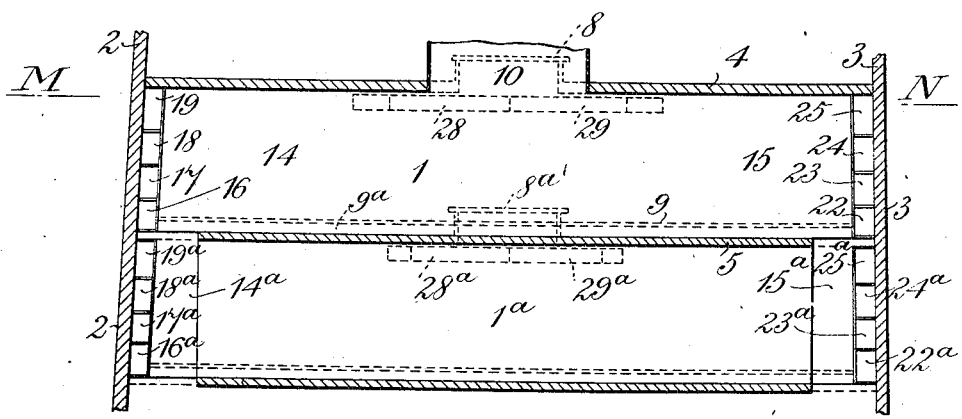
Figure 7:
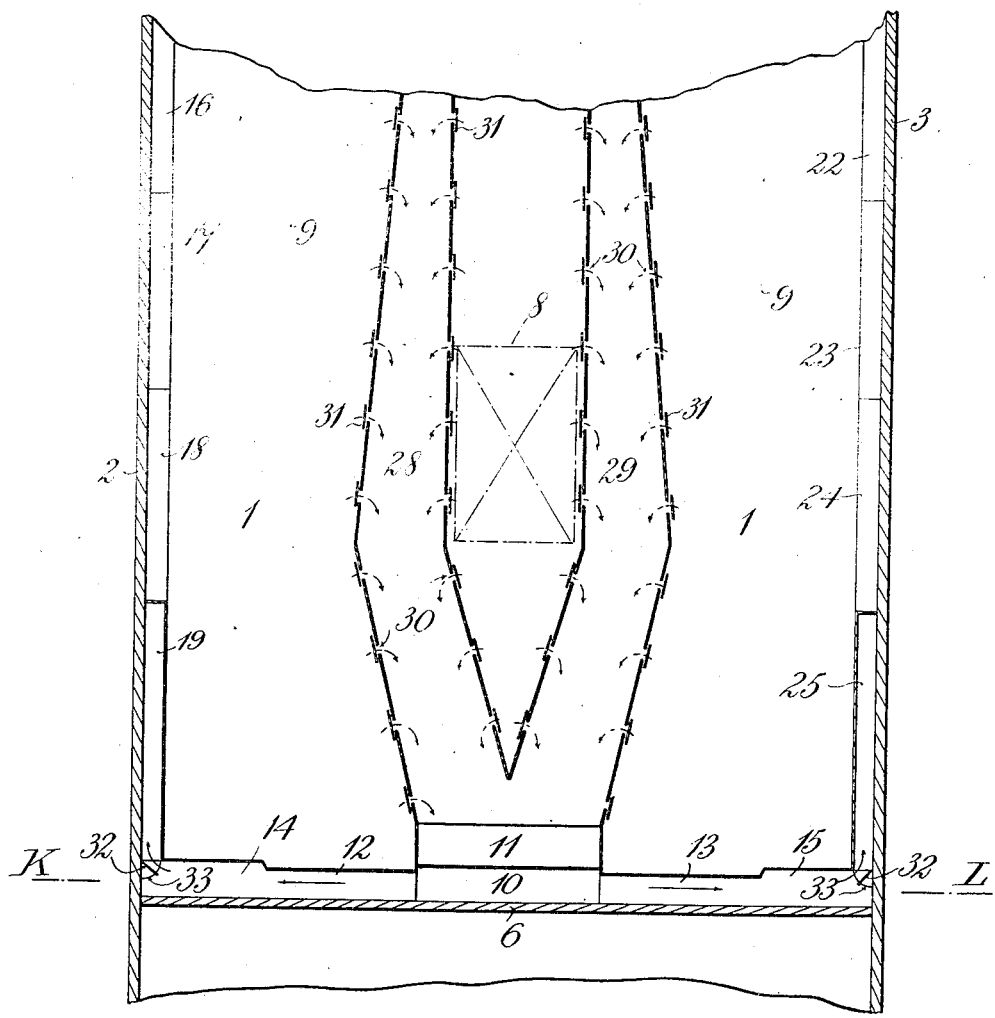

In the drawings, Figures 1 to 4, inclusive, illustrate the application of this invention to a single hold or cargo-space. Fig. 1 is a vertical cross-section on the line A B of Fig. 2, and Fig. 2 is a part-sectional plan on the line C D of Fig. 1. Fig. 3 is a partial vertical cross-section on the line E F of Fig. 2 drawn to a larger scale to illustrate details. Fig. 4 is a separate portion view of the portion G H of Fig. 2, also drawn to a larger scale to illustrate details. Fig. 5 is a vertical cross-section on the line I J of Fig. 2, illustrating the application of this invention to two or more holds or cargo-spaces situated one above the other. Fig. 6 is a vertical cross-section on the line K L of Fig. 7, and Fig. 7 is a part-sectional plan on the line M N of Fig. 6, illustrating a modification in the arrangement of the branch air-ducts.

Referring first to Figs. 1 to 4, inclusive, 1 indicates the hold or cargo-space comprised between the ship's sides 2 and 3, the upper and lower decks 4 and 5, the transverse bulkhead 6, and a corresponding transverse bulkhead 7. (Not shown in Fig. 2.) 8 is the cargo-hatch. 9 is the perforated false bottom on or over which the cargo (not shown) is stacked or piled. It extends over the entire floor area of the lower deck 5 and is raised off the said lower deck 5, so as to leave between it and the said deck an air-space $9^a$. It may be conveniently made in the form of a wooden grating 9, composed of battens spaced suitably apart running fore and aft and resting on bearers running athwartship, as indicated in the detail view, Fig. 3. 10 is a main air-duct situated at one end of the cargo-space close to the bulkhead 6, and 11 is another main air-duct situated alongside. The duct 10 is assumed to be connected to the discharge side of a fan or fans, (not shown,) and the duct 11 is assumed to be connected to the suction side of the said fan or fans.

The main duct 10 discharges left and right into branch main ducts 12 and 13, which are carried along the bulkhead 6, respectively, into air chambers or trunks 14 and 15, situated at opposite sides of the ship. From the air-chamber 14 a number of distributing air-ducts (four are shown by way of example) 16 17 18 19 are led fore and aft along the side 2 of the ship and are so arranged that the duct 16, which is nearest to the ship's side, is carried as far as and terminates as viewed in plan, Fig. 2, at a point distant, say, about one-fourth of the length of the cargo-space 1, while the next adjacent ducts 17 and 18 are carried as far as and terminate at points situated, respectively, say, at about half-way and three-quarters of the length of the cargo-space. The last duct 19 terminates at the bulkhead 7, situated at the farther end of the cargo-space. These distributing air-ducts are preferably designed to feed equal capacities of the ship's cargo-space. Such an arrangement will usually entail unequal lengths of the ducts on account of the ship usually becoming narrower toward its ends. These ducts are shown arranged horizontally and close up to the ship's side and the ceiling of the upper deck, Fig. 1, in order that they may occupy as little of valuable cargo-space as possible.

A lining 20 is carried up from the grating 9 to the air-ducts 16–19 up along the ship's side at a suitable distance therefrom, so as to leave an air-space 21 between it and the ship's side extending from duct 14 at bulkhead 6 to bulkhead 7—that is to say, along the entire length of the cargo-space. This space 21, as shown more clearly in Fig. 3, is open at the bottom to the space 9ª underneath the grating 9, and it is also open at the top to the respective distributing-ducts 16–19 throughout the length of its junction with each of said ducts. For this purpose the duct 16 is carried close along the top of the air-space 21, and duct 17 is carried close along the side of the duct 16 to the termination of the latter, where the duct 17 is carried inward to join the air-space 21, alongside and above which it runs to its own termination, where the next duct 18 joins the air-space 21, and similarly in the case of the distributing-duct 19 and any further distributing-ducts if more than four be employed. This is clearly shown in Fig. 2.

Similar distributing-ducts 22 23 24 25, lining 26, and air-space 27 are arranged in a corresponding manner along the opposite side 3 of the ship.

28 and 29 are main return-ducts which extend from the farther bulkhead 7 (where they stop short) and are carried along the cargo-space close under the deck-ceiling 4 on either side of the hatch or hatches 6 back to the main suction-duct 11. These return-ducts are formed with relatively numerous apertures 30, which are fitted with regulating-slides 31, whereby the amount of air-openings through said apertures can be regulated to cause an approximately even amount of air to flow through the different portions of the cargo-space with which they are in connection. This regulation is necessitated by the fact that part of the ducts 28 and 29, nearest to duct 11 is nearer the fan and therefore subjected to a greater air-pressure either in a negative or positive direction, as the case may be, according as the air is being discharged or extracted through these ducts 28 and 29.

The openings of the distributing-ducts 16–19 and 22–25 in their respective chambers 14 and 15 are preferably arranged en echelon, as shown, in order to equalize the distribution of the air-supply to said openings. These openings are fitted with adjustable baffle-doors 32, Fig. 4, provided with quadrant and thumb-screw adjusting-gear 35 for regulating the flow of air through each duct, or any other equivalent means may be employed.

The circulation of the air is indicated by arrows and is as follows: The air is discharged from the fan or fans through the main duct 10 and thence through the branch mains 12 and 13 into the side chambers 14 and 15, whence it passes through the distributing-ducts 16 17 18 19 to be discharged into the air-space 21 at one side of the cargo-space, and simultaneously, also, through the distributing-ducts 22 23 24 25 into the air-space 27 at the opposite side of the cargo-space. From the spaces 21 and 27 the air is discharged into the air-space 9ª below the grating 9, whence it rises up through the grating and becomes diffused among the cargo. On its exit from the upper surface of the cargo the air which has become heated by contact with the relatively warmer cargo is drawn through the apertures 30 into the return-ducts 28 and 29, and so into the main suction-duct 11, whence the air may be returned by the fan through air-cooling apparatus before being discharged into the main discharge-duct 10 to be recirculated in its cooled state through the cargo, as hereinbefore described.

In the preceding description ducts 10 and 11 are assumed to be connected to the discharging and suction sides, respectively, of the fan; but by a suitable arrangement of doors this direction of the air circulation may be reversed, if desired, and the air may be discharged through ducts 11, 28, and 29 into the top of the cargo-space 1 and be drawn down through the cargo and extracted through the grating 9, air-space 9ª, spaces 21 and 27, and drawn through the distributing-ducts 16–19 and 22–25 and through the main ducts 12 and 13 and 10 back to the fan. In this case the duct 10 is connected to the suction and duct 11 to the discharge side of the fan.

The linings 20 and 26 may be conveniently made of boarding constructed over battens 34, Fig. 3, which are arranged vertically, so as not to obstruct the flow of air through the spaces 21 and 27.

The main ducts 10 12 13 and the chambers 14 and 15 are made wide enough and suitable doors and ladders are provided in them to allow of an attendant passing through the same for the purpose of adjusting the doors 32, that control the openings of the distributing-ducts 16-19 and 22-25. By this means the flow of air admitted through the distributing-ducts into the cargo-space can be efficiently regulated at all times without the necessity of providing passage-ways for the attendant along the ship's sides or among the cargo, and thus losing valuable cargo-space.

Although the figures show two return-ducts 28 and 29, only one return-duct or more than two such ducts may be provided and employed as found suitable.

When two or more cargo-spaces situated one below the other are to be ventilated according to this invention, a suitable arrangement is as shown in Fig. 5, where 1 is the upper cargo-space and 1ᵃ the lower cargo-space. For the purposes of this invention the air-chambers 14 and 15 are carried down at the sides of the ship through the floor or deck 5, below which they communicate with the distributing-ducts 16ᵃ-19ᵃ and 22ᵃ-29ᵃ. The said air-chambers are made large enough to carry the whole of the air required to ventilate the whole of the cargo-spaces 1 1ᵃ, &c. So much of the air as is required to be circulated through the cargo-space 1 is taken by the distributing-ducts 16-19 and 22-29, the remainder of the air being conveyed to the cargo-space 1ᵃ and in a similar manner to any other cargo-spaces below, if any.

The horizontal side-by-side arrangement of the distributing-ducts 16-19 and 22-25 under the deck-ceiling, as shown in Figs. 1, 3, and 5, is preferred on account of the facility afforded thereby of gaining access to the cargo-space through the side ports of the ship, suitable doors being provided in the linings 20 and 26 for this purpose. If, however, such facility is not desired, the distributing-ducts may be arranged horizontally one below the other in a vertical plane against the ship's side. With this arrangement of the distributing-ducts the air-spaces 21 and 27 may be considerably lessened in height, or they may even be entirely dispensed with, as shown in Figs. 6 and 7. In this latter case the openings in the bottoms of the distributing-ducts would be below the level of the grating 9.

Although in the drawings the main ducts 10 12 13 are shown across ship and the distributing-ducts 16-19 and 22-25 are shown extending along the ship's sides, this arrangement might be reversed, if desired, the main ducts being arranged at one or the other side of the ship and the distributing-ducts being carried across ship along the bulkheads 6 and 7 at each end of the cargo-space.

Having now described my invention, what I claim as new, and desire to secure by Letters Patent, is—

1. In a closed cargo-space of a ship or the like, the combination with the floor of the cargo-space, of a perforated false bottom raised off the floor of the cargo-space, so as to form an air-chamber under said perforated bottom, side walls or partitions constituting a lateral air-space open along its upper length extending approximately along the entire length of one side of the cargo-space, and also extending in a downward direction approximately the entire depth of the cargo-space, communicating throughout its lower length with the air-chamber under said perforated false bottom, a similarly-constituted lateral air-space located at the opposite side of the cargo-space, an air-supply duct communicating continuously with the entire upper length of each said lateral air-space at its junction therewith, and an approximately horizontal air-exhaust duct extending approximately the entire length of the central upper part of the cargo-space provided with relatively numerous air-apertures spaced uniformly throughout its length, whereby the air is caused to circulate in an approximately vertical direction through the cargo, with approximately uniform pressure in horizontal distribution.

2. In a closed hold or cargo-space of a ship or the like the combination with the floor and sides of the cargo-space, of a perforated false bottom raised off the floor of the cargo-space, so as to form an air-chamber under said perforated bottom, a partition extending along approximately the whole of one inner side of the cargo-space at a distance therefrom, from said perforated bottom up to near the top of the cargo-space, whereby a lateral air-space open at the top and bottom is formed between said partition and said inner side of the cargo-space, a similarly-constituted partition located at the opposite side of the cargo-space, whereby a similar lateral air-space is formed on said opposite side of the cargo-space, an air-supply duct communicating continuously with the entire upper length of said lateral air-space on each side at its junction therewith, and an approximately horizontal air-exhaust duct extending approximately the entire length of the central upper part of the cargo-space, provided with relatively numerous air-apertures spaced uniformly throughout its length, whereby the air is caused to circulate in an approximately vertical direction through the cargo with approximately uniform pressure in horizontal distribution.

3. In a closed cargo-space of a ship or the like, the combination with the floor of the cargo-space, of a perforated false bottom raised off the floor of the cargo-space so as to form an air-chamber under said perforated bottom, side walls or partitions constituting a lateral air-space open along its entire upper length extending along approximately the entire length of one side of the cargo-space, and also extending in a downward direction approximately the entire depth of the cargo-space and communicating throughout its lower length with the air-chamber under said perforated bottom, a horizontal series of air-supply ducts communicating in immediately adjacent continuous consecutive order with the entire upper length of said lateral air-space, so that the aggregate length of the junctions of the said air-supply ducts with said lateral air-chamber is equal to the entire upper length of the latter, a similarly-constituted lateral air-space and a similar horizontal series of air-supply ducts located at the opposite side of the cargo-space, and an approximately horizontal air-exhaust duct extending approximately the entire length of the central upper part of the cargo-space having relatively numerous air-apertures spaced uniformly throughout its length whereby the air is caused to circulate in an approximately vertical direction through the cargo with approximately uniform pressure in horizontal direction.

4. In a closed hold or cargo-space of a ship or the like the combination with the floor of said cargo-space, of a perforated false bottom raised off the floor of said cargo-space, so as to form an air-chamber under said perforated bottom, a horizontal series of air-supply ducts located in immediately adjacent consecutive order side by side along approximately the entire length of one side of said cargo-space and communicating at their lower ends with said air-chamber below said perforated bottom continuously throughout their several junctions with said air-chamber, a common air-supply duct delivering into said air-supply ducts, and an air-duct exhausting from approximately the entire length of the upper part of said cargo-space, whereby air delivered by said common air-supply duct into said series of air-supply ducts is delivered sectionally by the latter in distribution proportionate to the horizontal extent of the cargo located opposite to each duct of said series of air-supply ducts, into said air-chamber below said perforated bottom.

5. In a closed hold or cargo-space of a ship or the like the combination with the floor of said cargo-space, of a perforated false bottom raised off the floor of said cargo-space so as to form an air-chamber under said perforated bottom, a horizontal series of air-supply ducts located in immediate adjacent consecutive order side by side along approximately the entire length of one side of said cargo-space, and communicating at their lower ends with one side of said air-chamber below said perforated bottom continuously throughout their several junctions with said air-chamber, an opposite horizontal series of air-supply ducts communicating similarly with the opposite side of said chamber, common air-supply ducts delivering respectively into said series of air-supply ducts, and air-ducts exhausting from approximately the entire length of respective opposite sides of the upper part of said cargo-space, whereby air is delivered sectionally by said air-supply ducts in distribution proportionate to the horizontal extent of the cargo located opposite to each duct of said horizontal series of air-supply ducts, into said air-chamber below said perforated bottom.

6. In a ship or the like containing a plurality of closed superposed holds or cargo-spaces, the combination with the floor of each cargo-space of a perforated false bottom raised off the floor of said cargo-space so as to form an air-chamber under said perforated bottom, a horizontal series of air-supply ducts in each said cargo-space located in immediately adjacent consecutive order side by side along approximately the entire length of each of two opposite sides of each said cargo-space, and communicating at their lower ends with their respective sides of said chamber, below said perforated bottom, a common air-supply duct delivering into said air-supply ducts of said cargo-spaces, and air-ducts in each said cargo-space exhausting from approximately the entire length of each said cargo-space, whereby air is delivered sectionally into the air-chamber below the perforated bottom of each cargo-space from both sides of each said cargo-space.

In testimony whereof I have signed my name to this specification in the presence of two subscribing witnesses.

LLEWELLYN WILLIAMS.

Witnesses:
WM. H. BYRNES, Jr.,
CHAS. I. DENECHAUD.